US008897545B2

(12) United States Patent
Schlosser et al.

(10) Patent No.: US 8,897,545 B2
(45) Date of Patent: Nov. 25, 2014

(54) APPARATUS AND METHOD FOR DETERMINING A CONFIDENCE VALUE OF A DISPARITY ESTIMATE

(75) Inventors: Markus Schlosser, Hannover (DE); Joern Jachalsky, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 78 days.

(21) Appl. No.: 13/611,727

(22) Filed: Sep. 12, 2012

(65) Prior Publication Data

US 2013/0064443 A1    Mar. 14, 2013

(30) Foreign Application Priority Data

Sep. 13, 2011  (EP) .................................... 11306142

(51) Int. Cl.
*G06K 9/00*    (2006.01)
*G06T 7/00*    (2006.01)

(52) U.S. Cl.
CPC ..... *G06T 7/0075* (2013.01); *G06T 2207/10012* (2013.01)
USPC ........................................................ 382/154

(58) Field of Classification Search
None
See application file for complete search history.

(56) References Cited

U.S. PATENT DOCUMENTS

| 6,931,150 | B2 | 8/2005 | Zhang et al. | |
| 7,599,547 | B2 | 10/2009 | Sun et al. | |
| 2012/0014590 | A1* | 1/2012 | Martinez-Bauza et al. | 382/154 |
| 2012/0321172 | A1* | 12/2012 | Jachalsky et al. | 382/154 |

FOREIGN PATENT DOCUMENTS

WO    WO2011104151 A1    9/2011

OTHER PUBLICATIONS

Xu, Li, and Jiaya Jia. "Stereo matching: An outlier confidence approach." Computer Vision—ECCV 2008. Springer Berlin Heidelberg, 2008. 775-787.*
Yang, Qingxiong, et al. "Stereo matching with color-weighted correlation, hierarchical belief propagation, and occlusion handling." Pattern Analysis and Machine Intelligence, IEEE Transactions on Mar. 31, 2009: 492-504.*
Tomasi, Carlo, and Roberto Manduchi. "Bilateral filtering for gray and color images." Computer Vision, 1998. Sixth International Conference on. IEEE, 1998.*
Jachalsky J et al: "Confidence evaluation for robust, fast-converging disparity map refinement", Multimedia and Expo, (ICME), IEEE, Jul. 19, 2010, pp. 1399-1404.
European Seaerch Report dated Jan. 25, 2012.

(Continued)

*Primary Examiner* — Stephen R Koziol
*Assistant Examiner* — Sean Conner
(74) *Attorney, Agent, or Firm* — Myers Wolin LLC

(57) ABSTRACT

A method and an apparatus for determining a confidence value of a disparity estimate for a pixel or a group of pixels of a selected image of at least two stereo images are described, the confidence value being a measure for an improved reliability value of the disparity estimate for the pixel or the group of pixels. First an initial reliability value of the disparity estimate for the pixel or the group of pixels is determined, wherein the reliability is one of at least reliable and unreliable. Then a distance of the pixel or the group of pixels to a nearest pixel or group of pixels with an unreliable disparity estimate is determined. Finally, the confidence value of the disparity estimate for the pixel or the group of pixels is obtained from the determined distance.

9 Claims, 5 Drawing Sheets

(56) References Cited

OTHER PUBLICATIONS

Li-Li Cai et al.: "Local stereo matching with edge-based cost aggregation and occlusion handling" Publication Date: Oct. 17, 2009.
Heiko Hirschmueller_et al.: "Evaluation of stereo matching costs on images with radiometric differences", Pubiication Date: Sep. 2009.
http_vision.middlebury.edu_stereo, Publication Date: Jul. 27, 2011.
Daniel Scharstein et al: "A taxonomy and evaluation of dense two-frame stereo correspondence algorithms", Publication Date: Apr. 1, 2002.
Liang Wang et al.: "Search space reduction for MRF stereo", Publication Date: Oct. 12, 2008.
Zhai et al.: "Stereo matching for larger disparity range using gradient information and adjacent segments cooperative optimization", Publication Date: Dec. 20, 2008.

\* cited by examiner a) [1.0,0.9]

b) [1.0,0.8]

c) [1.0,0.7]

d) [1.0,0.6]

e) [1.0,0.5]

f) [1.0,0.4]

g) [1.0,0.3]

h) [1.0,0.2]

i) [1.0,0.1]

j) [1.0,0.0]

APPARATUS AND METHOD FOR DETERMINING A CONFIDENCE VALUE OF A DISPARITY ESTIMATE

This application claims the benefit, under 35 U.S.C. §119 of EP Patent Application 11306142.8, filed 13 Sep. 2011.

FIELD OF THE INVENTION

The invention relates to a method and to an apparatus for determining a confidence value of a disparity estimate, and more specifically to a method and to an apparatus for determining a confidence value of a disparity estimate for a pixel or a group of pixels of a selected image of at least two stereo images.

BACKGROUND OF THE INVENTION

In 3D-TV, 3D-video and 3D-cinema, information of two or even more images is joined together for production of a spatial reproduction of image content. Typically, two stereoscopic images are used for computation of depth information, wherein a matching process is applied to find point correspondences in the two input or basic images. The displacement between two corresponding points in the basic images resulting from the different positions of the cameras when capturing the real world scene is commonly referred to as disparity. A 3D-structure, i.e. the depth information of the captured scene, may be reconstructed from these disparities by triangulation if the camera parameters are known. Depth information for the pixels in the basic images is usually integrated into a disparity map containing the result of the respective matching calculations.

The performance of the stereo matching process inherently depends on the underlying image content. Even for ideal conditions there still remain several problems, e.g. occluded areas in one of the input pictures, perspective deformations due to lens distortions, specular reflections or missing texture in some region of the image, etc., that make the matching process a challenging task. For some parts of an image it is inherently more difficult to determine accurate values for the disparity, also referred to as disparity estimates, than for others. This leads to varying levels of accuracy and reliability for the disparity estimates.

For some applications, e.g. for subtitling or positioning of graphical overlays, it is beneficial to select a reliable or even highly reliable subset of disparity estimates from a dense disparity map in order to create a reliable or highly reliable sparse disparity map. Moreover, for post-production purposes it is beneficial to accurately mark problematic and non-problematic regions to process them with special algorithms etc.

The above can be accomplished with a confidence evaluation, which determines the reliability of a disparity estimate to evaluate whether it is an accurate point correspondence or not. To this end the confidence evaluation provides a certain level of selectivity. An increased selectivity of the confidence evaluation leads to a higher share of accurate point correspondences at the cost of a reduced coverage. Ideally, the share of accurate point correspondences is close to 100% for the highest confidence values or an interval comprising only the highest confidence values and then it slowly decreases for lower confidence values with a high concentration of the remaining inaccurate point correspondences at the confidence of 0.

SUMMARY OF THE INVENTION

It is thus an object of the invention to propose a method for determining a confidence value of a disparity estimate for a pixel or a group of pixels.

According to one aspect of the invention, a method for determining a confidence value of a disparity estimate for a pixel or a group of pixels of a selected image of at least two stereo images, wherein the confidence value is a measure for an improved reliability value of the disparity estimate for the pixel or the group of pixels, comprises the steps of:

determining an initial reliability value of the disparity estimate for the pixel or the group of pixels, wherein the initial reliability value is one of at least reliable and unreliable;

determining a first distance of the pixel or the group of pixels to a nearest pixel or group of pixels with an unreliable disparity estimate; and determining the confidence value of the disparity estimate for the pixel or the group of pixels from the determined distance.

The general idea is to evaluate the neighborhood relations of pixels with reliable disparity estimates to increase the selectivity of the confidence evaluation. Thereby, the distances of pixels with reliable disparity estimates to pixels with unreliable disparity estimates are used to calculate the confidence value of the disparity estimate. Reliable estimates are considered more reliable if surrounded by other reliable estimates and thus far away from unreliable ones.

Advantageously, the initial reliability value of the pixel or the group of pixels is determined from a remaining distance between the pixel or the group of pixels in a first stereo image and a back reference of a corresponding pixel or a corresponding group of pixels in a second stereo image, wherein the corresponding pixel or the corresponding group of pixels is defined by the disparity estimate for the pixel or the group of pixels of the selected image.

The remaining distance is a measure for the inconsistency and can be determined based on the left-right consistency. Moreover, it is highly suited to determine the initial reliability.

Preferably, the disparity estimate of the pixel or the group of pixels is classified as unreliable if the remaining distance is equal to or larger than an upper threshold, e.g. three pixels. Similarly, the disparity estimate of the pixel or the group of pixels is classified as reliable if the remaining distance is equal to or lower than a lower threshold. Favorably, the lower threshold is zero.

In this way it is ensured that only for pixels or groups of pixels with a very small or even no left-right inconsistency the disparity estimate is assumed to be reliable. For pixels or groups of pixels with a rather large left-right inconsistency the disparity estimate is assumed to be unreliable.

Advantageously, a visibility of the pixel or the group of pixels is determined, wherein a pixel or a group of pixels in the first stereo image is visible if it is matched by at least one pixel or at least one group of pixels in the second stereo image, and wherein a pixel or a group of pixels in the first stereo image is not visible if it is not matched by any pixel or any group of pixels in the second stereo image. Based on the determined visibility, the disparity estimate of the pixel or the group of pixels is also classified as reliable if the remaining distance is equal to the lower threshold plus one and the pixel or the group of pixels is not visible.

Both the disparity estimation as well as the confidence evaluation are preferably done on full-pel resolution only, in order to limit the necessary computational effort. Taking the visibility into account allows to handle the case of horizontally slanted surfaces, which can have a different width in the two views. As a consequence, the disparity estimation for one view needs to omit a pixel every now and then in the other view.

Favorably, the disparity estimate of the pixel or the group of pixels is classified as undecided if the disparity estimate of the pixel or the group of pixels is neither reliable nor unreliable.

Undecided disparity estimates are used to determine a second distance, namely the distance of the pixel or the group of pixels to a nearest pixel or group of pixels with a not-reliable disparity estimate, wherein the not-reliable disparity estimate is either undecided or unreliable. The confidence value of the disparity estimate for the pixel or the group of pixels is then determined from the first distance and the second distance. This allows to give different weights to clearly unreliable disparity estimates and to disparity estimates that are not-reliable, but not necessarily unreliable.

Preferably, a special consistency value is derived from the first distance, an upper bound for the first distance, the second distance, and a range factor. The confidence value of the disparity estimate for the pixel or the group of pixels is then determined by multiplying the special consistency value with a scaled matching quality value. The scaled matching quality value is a scaled correlation coefficient obtained by a zero-mean normalized cross correlation or another similarity measure.

Favorably, a confidence value of zero is assigned to the disparity estimate of the pixel or the group of pixels if the disparity estimate of the pixel or the group of pixels is classified as unreliable. This allows to fully exclude unreliable disparity estimates from further processing steps, e.g. refinement or post-processing.

Advantageously, an apparatus for determining a confidence value of a disparity estimate for a pixel or a group of pixels of a selected image of at least two stereo images, wherein the confidence value is a measure for an improved reliability value of the disparity estimate for the pixel or the group of pixels, is adapted to perform the above described method steps for determining the confidence value.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

The purpose of the confidence evaluation is to determine the reliability of a disparity estimate and thus to evaluate whether it is an accurate point correspondence or not. The resulting confidence values gradually indicate the level of reliability of the corresponding disparity estimates ranging from unreliable (lowest confidence value) to highly reliable (highest confidence value). In the approach that is described in the following, the confidence evaluation combines the quality of a stereo match (in terms of the matching metric used) with its consistency (in terms of the uniqueness and visibility constraints) in a single continuous confidence value that explicitly models the reliability of the disparity estimate. The general idea is that only those estimates are considered reliable that achieve a high matching score and are consistent.

Input for the confidence evaluation are two disparity maps $D_L$ and $D_R$ estimated for an image pair consisting of a left and right view. $D_L$ is the map for the estimation from left to right view and $D_R$ is the map for the estimation from right to left view. Hereinafter only the calculation of the confidence for the disparity map $D_L$ is described. The calculation of the confidence for the other disparity map $D_R$ is done in an analogous manner.

Figure 1:
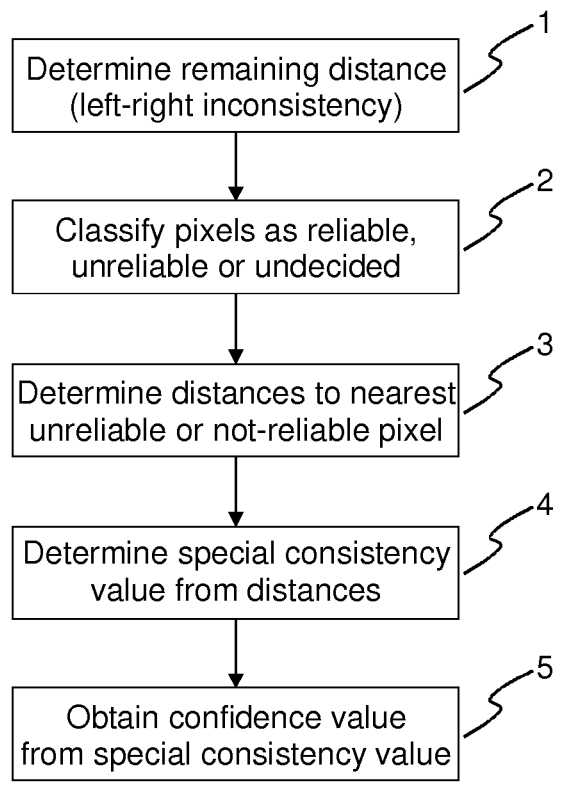
FIG. 1 schematically depicts a method according to the invention.

A method according to the invention for determining a confidence value is schematically depicted in FIG. 1. In a first step 1 of the confidence evaluation the left-right consistency is determined utilizing the uniqueness constraint. For each pixel p in the left view it is checked if the corresponding pixel $p+D_L(p)$ in the right view refers back to the original pixel p. The potentially remaining distance $d_{LR}$ between the back reference and the original pixel is a measure for the inconsistency and can be calculated as $$d_{LR}(p)=|D_L(p)+D_R(p+D_L(p))|. \quad (1)$$

The term $d_{LR}$ is calculated for each pixel p in the left view. In addition, it is checked if the pixel p also satisfies the visibility constraint. The latter requires that a visible pixel is matched by at least one pixel in the other view and a non-visible pixel is not matched. Instead of performing the calculations on a pixel basis, it is likewise possible to use groups of pixels.

In a second step 2 the disparity estimate of each pixel is classified as either unreliable, reliable, or undecided based on the inconsistency $d_{LR}$ and visibility. The disparity estimate of a pixel is considered unreliable if $d_{LR}$ is equal to or larger than an upper threshold $th_{up}$, i.e. $d_{LR} \geq th_{up}$. Preferably, the upper threshold $th_{up}$ is 3. For a reliable disparity estimate of a pixel either of the following conditions must be fulfilled.

$$d_{LR} \leq th_{lo} \quad (2)$$

$$d_{LR}=th_{lo}+1 \text{ and pixel is not visible}, \quad (3)$$

where $th_{lo}$ is a lower threshold. Preferably, the lower threshold $th_{lo}$ is 0. The second condition in equation (3) is introduced as both the disparity estimation as well as the confidence evaluation are done on full-pel resolution only. It handles the case of horizontally slanted surfaces, which can have a different width in the two views. As a consequence, the disparity estimation for one view needs to omit a pixel every now and then in the other view. Thus, for the omitted pixel, which is not visible, the remaining distance $d_{LR}$ is one higher than the remaining distance for the adjacent not-omitted pixel. In the preferable case with $th_{lo}$ set to 0 $d_{LR}$ is 1 for the omitted pixel.

Disparity estimates that are neither unreliable nor reliable are classified as undecided. Based on this initial classification the following two distances are determined in a third step 3:

$d_{un}$: distance to the next pixel with an unreliable disparity estimate;

$d_{not}$: distance to the next pixel with a not reliable disparity estimate, which is either undecided or unreliable.

Figure 2:
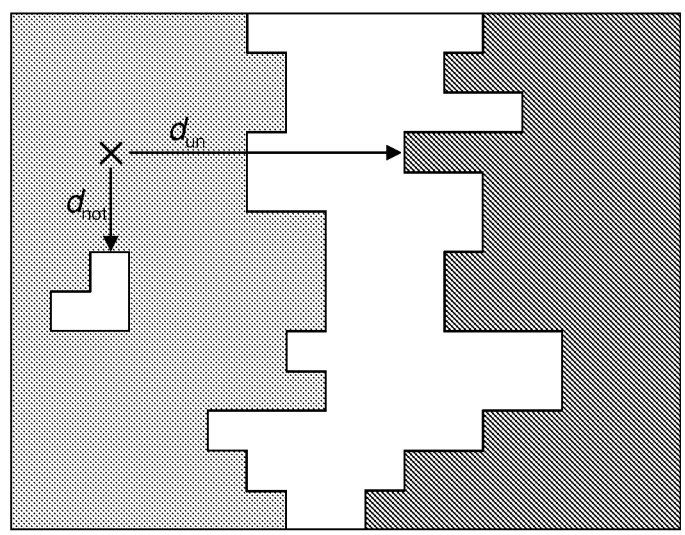
FIG. 2 illustrates the distances of a pixel to pixels with unreliable and not reliable disparity estimates.

The two distances are illustrated in FIG. 2, where light grey pixels have a reliable disparity estimate, dark grey pixels have an unreliable disparity estimate, and white pixels are undecided. For each distance an upper bound is specified, namely $d_{un\_max}$ and $d_{not\_max}$. The upper bounds define the distance that a pixel with a reliable disparity estimate must have to the next pixel with an unreliable and/or undecided disparity estimate in order to achieve a maximum confidence. These upper bounds are introduced to limit the search range and, thus, limit the processing costs. Moreover, pixels that are too far away, i.e. not in the spatial proximity, provide only little additional information to determine the confidence of the disparity estimate of the considered pixel.

Both bounds include a scaling factor γ:

$$d_{not\_max} = \gamma \cdot k_{not} \qquad (4)$$

$$d_{un\_max} = \gamma \cdot k_{un}, \qquad (5)$$

where $k_{not}$ is a base value for the distance to the next pixel with a not reliable disparity estimate and $k_{un}$ is a base value for the distance to the next pixel with an unreliable disparity estimate. The maximum confidence is achieved for $d_{un} \geq d_{un\_max}$ and $d_{not} \leq d_{not\_max}$. The scaling factor γ is introduced to have an identical and thus comparable maximum for the confidence values while varying the upper bounds and, hence, the selectivity.

In a fourth step 4 a confidence of 0 is assigned to unreliable. disparity estimates. For a pixel with an unreliable disparity estimate $d_{un}$ is 0. For each pixel with a reliable disparity estimate a special consistency value $C_{scv}$ is calculated using the below equation (8). For a pixel with a reliable disparity estimate it holds that $d_{un} > 0$ and $d_{not} > 0$.

$$C_{un} = \alpha_1 \cdot d_{un} (d_{un\_max} - \alpha_2 \cdot d_{un}) / \gamma^2 \qquad (6)$$

$$C_{not} = \beta \cdot (d_{not} - \gamma) / \gamma, \qquad (7)$$

$$C_{scv} = C_{un} + C_{not} \qquad (8)$$

In the above formulae $\alpha_1$, $\alpha_2$, and β are parameterization coefficients. Pixels with undecided disparity estimates are treated separately. For those it holds that $d_{un} > 0$ and $d_{not} = 0$.

Their special consistency value is calculated using the below equation (9) instead of the above equation (8):

$$C_{scv} = \delta \cdot C_{un} \qquad (9)$$

In a fifth and final step 5 the special consistency value $C_{scv}$ is multiplied with a scaled matching quality value $C_{mqv}$ to obtain the final confidence value C.

$$C = C_{mqv} \cdot C_{scv} \qquad (10)$$

$C_{mqv}$ is a scaled correlation coefficient, which is preferably obtained by a zero-mean normalized cross correlation, and is in the interval of [0.0, 1.0].

The greater the value of γ, the greater the distance of a pixel with a reliable disparity estimate to pixels with unreliable and not reliable disparity estimates must be to obtain a high confidence, which results in an increased selectivity. The highest confidence is typically achieved for disparity values inside of objects. The disparities at the object borders are assigned lower values. Thus, the increased selectivity can—amongst others—be used to diminish the impact of errors caused by enlarged foreground objects due to the employed window-based estimation approach.

Figure 3:
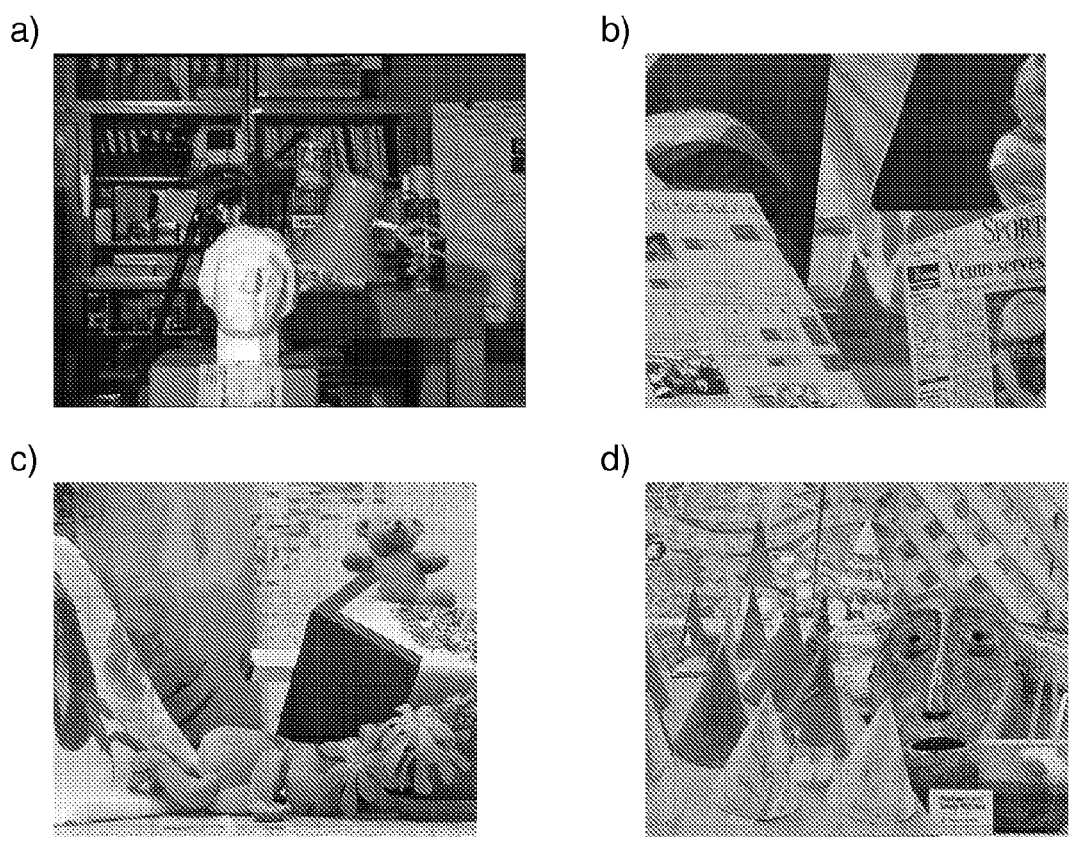
FIG. 3 depicts the left views of four stereo pairs.
Figure 4:
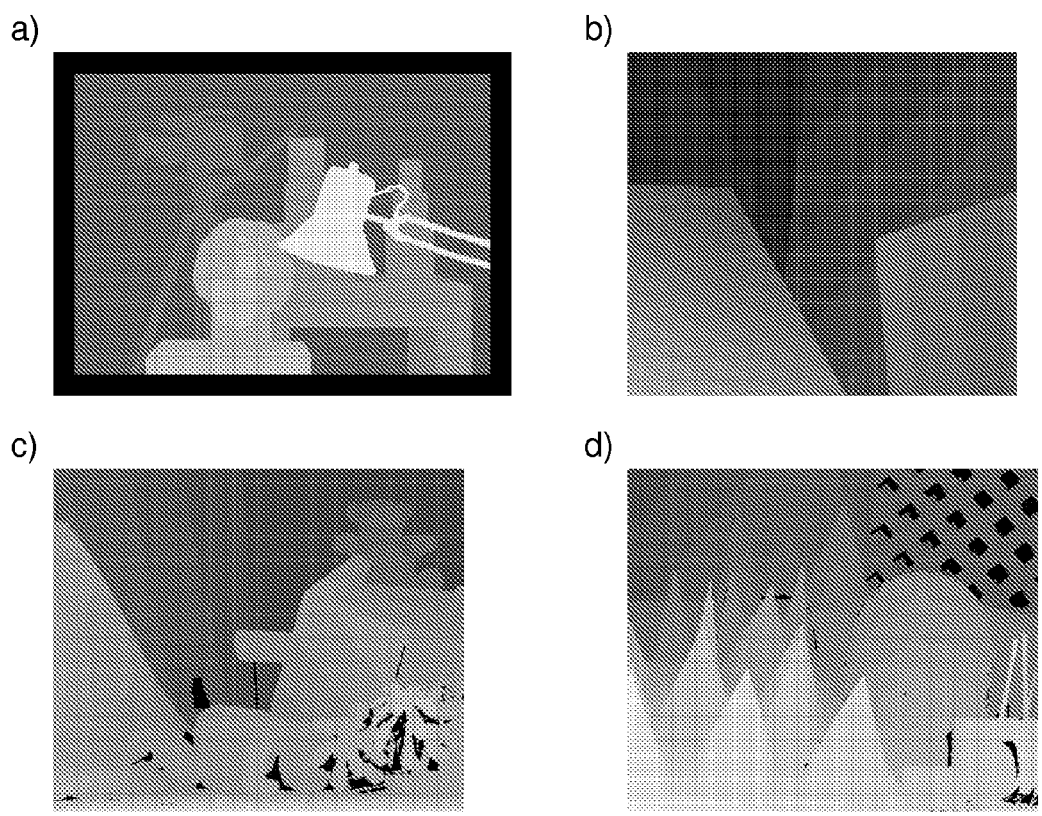
FIG. 4 shows the ground truth for the four stereo pairs of FIG. 3.
Figure 5:
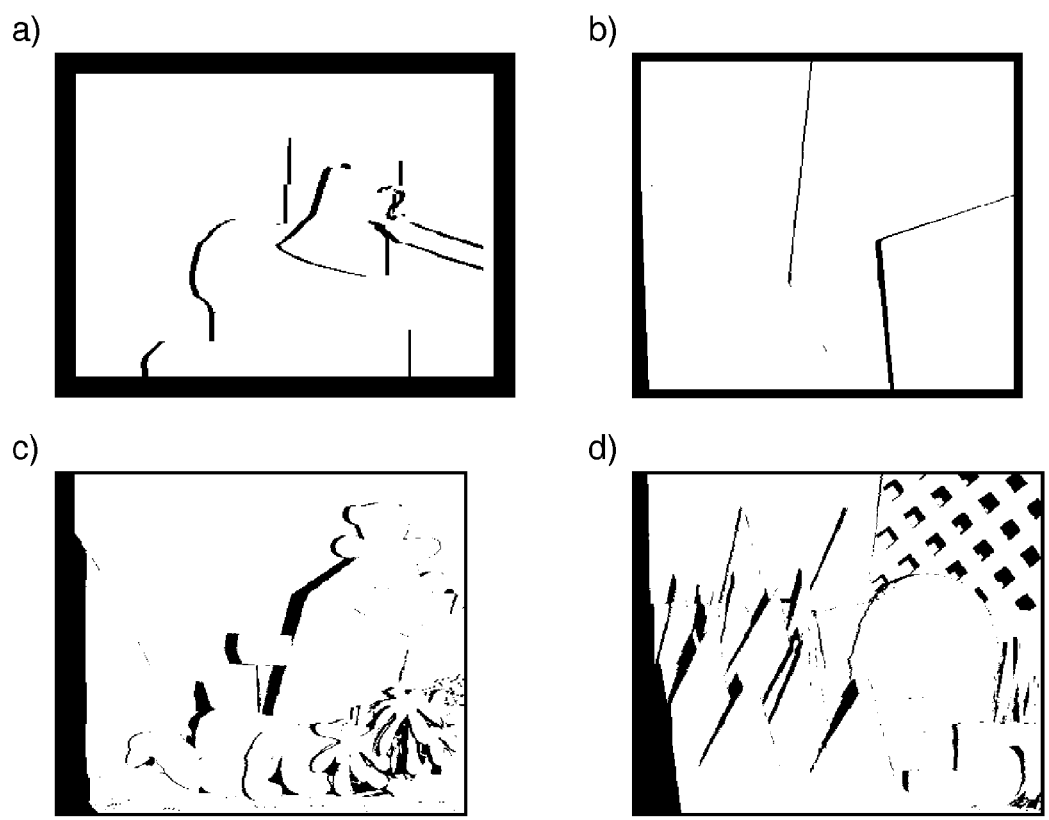
FIG. 5 depicts masks for non-occluded and non-border pixels for the four stereo pairs of FIG. 3.

In the following the results of confidence evaluation in accordance with the present invention shall be described. For the disparity estimation a local window-based approach was employed with zero-mean normalized cross correlation as cost function. For further details see H. Hirschmüller et al.: "*Evaluation of stereo matching costs on images with radiometric differences*", IEEE Transact. Patt. Anal. Mach. Intell. Vol. 31 (2009), pp. 1582-1599. The costs were calculated for the complete disparity range [0; $d_{max}$−1] and the disparity with the lowest aggregated costs was selected (so-called "winner-takes-all"-mechanism). The window size was set to 8×8 and $d_{max}$=60. FIG. 3 displays the left views of the four stereo pairs Tsukuba (FIG. 3a)), Venus (FIG. 3b)), Teddy (FIG. 3c)), and Cones (FIG. 3d))*of* the Middlebury test set, which was used as an input for the present evaluation. For details of the Middlebury test set see http://vision.middlebury.edu/stereo/ and D. Scharstein et al.: "*A taxonomy and evaluation of dense two-frame stereo correspondence algorithms*", Int. J. Comput. Vis. Vol. 47 (2002), pp. 7-42. FIG. 4 depicts the ground truth for the four stereo pairs and FIG. 5 shows in white the masks for non-occluded and non-border pixels. For the sake of brevity, they are both hereinafter referred to as non-occluded pixels. While FIG. 4a) and FIG. 4b) depict the original, unaltered masks for Tsukuba and Venus as provided on the Middlebury website, the masks for Teddy and Cones have a border region that was set to be four pixels wide, i.e. half the window size. This region was introduced to simplify the window handling.

The disparities were estimated for the two directions left-to-right and right-to-left. In contrast to the above cited work of H. Hirschmüller et al. no post-processing or refinement was done. Finally, the confidence values were calculated as described above. For the present evaluation the confidence values were only calculated for the disparity map $D_L$. The disparity estimation and confidence evaluation was done on full-pel resolution only and no additional sub-pel interpolation was applied.

In order to assess the selectivity of the confidence evaluation, the range of the confidence values was split into intervals and for each interval the share of bad matches for all non-occluded pixels covered by the interval was determined.

A pixel is considered a bad match if its disparity differs by more than one from the ground truth. For the present evaluation the confidence values were normalized to be in the range from 0.0 (unreliable) to 1.0 (highly reliable).

For each confidence interval $I_k$ the number of non-occluded pixels $N_{nocc;k}$ covered by the interval was determined and afterwards the number of bad matches $N_{bad;k}$ among those non-occluded pixels. Therewith, for each interval the coverage, which is the ratio of $N_{nocc;k}$ and the total number of non-occluded pixels in the view, as well as the corresponding share of bad pixels, which is the ratio of $N_{bad;k}$ and $N_{nocc;k}$, was calculated.

Table 1 displays the results as an average over all four image pairs (Tsukuba, Venus, Teddy, and Cones) for different range factors γ. The parameter set used for the evaluation was $k_{not}$=4.0, $k_{un}$=7.0, $\alpha_1$=5, $\alpha_2$=0.5, β=25, and δ=0.5. The sub-columns 'Coverage' contain the pixel coverage and the sub-columns 'Error' the corresponding share of bad pixels.

TABLE 1

| Interval $I_k$ | γ | | | | | | | |
|---|---|---|---|---|---|---|---|---|
| | 1.0 | | 2.0 | | 3.0 | | 4.0 | |
| | Coverage [%] | Error [%] | Coverage [%] | Error [%] | Coverage [%] | Error [%] | Coverage [%] | Error [%] |
| [1.0; 0.9] | 41.41 | 1.40 | 22.94 | 0.32 | 11.01 | 0.11 | 4.89 | 0.00 |
| [1.0; 0.8] | 55.40 | 1.84 | 32.83 | 0.46 | 17.87 | 0.19 | 9.10 | 0.09 |
| [1.0; 0.7] | 63.34 | 2.11 | 41.77 | 0.74 | 25.23 | 0.31 | 14.41 | 0.18 |
| [1.0; 0.6] | 70.57 | 2.73 | 50.54 | 1.15 | 33.46 | 0.51 | 21.47 | 0.29 |
| [1.0; 0.5] | 75.53 | 3.10 | 58.83 | 1.60 | 42.67 | 0.89 | 29.41 | 0.52 |
| [1.0; 0.4] | 79.39 | 3.61 | 65.72 | 2.15 | 51.68 | 1.29 | 38.63 | 0.81 |
| [1.0; 0.3] | 82.61 | 4.15 | 70.17 | 2.57 | 58.94 | 1.79 | 46.78 | 1.21 |
| [1.0; 0.2] | 85.92 | 4.57 | 76.47 | 3.29 | 66.36 | 2.45 | 55.90 | 1.83 |
| [1.0; 0.1] | 90.90 | 5.93 | 82.20 | 4.24 | 73.14 | 3.31 | 63.15 | 2.57 |
| [1.0; 0.0] | 100.00 | 11.12 | 100.00 | 11.12 | 100.00 | 11.12 | 100.00 | 11.12 |

It is apparent that the confidence evaluation becomes more selective with an increasing range factor γ. For the highest interval [1.0; 0.9] the share of bad matches decreases from 1.40% for γ=1 to 0.00% for γ=4. At the same time the coverage is reduced from 41.41% to only 4.89%. In addition, for γ=1 the interval [0.1; 0.0] comprises roughly 10% of all non-occluded pixels, for γ=4 these are 37%, resulting in a sub-optimal coverage. Thus, there is a trade-off between selectivity and coverage for the interval [1.0; 0.1].

Table 2 provides a closer look at the results for γ=3.0 depicting the results for each image pair separately. It reveals how the coverage as well as the share of bad pixels deviate among the four image pairs.

TABLE 2

| Interval $I_k$ | Tsukuba | | Venus | | Teddy | | Cones | |
|---|---|---|---|---|---|---|---|---|
| | Coverage [%] | Error [%] | Coverage [%] | Error [%] | Coverage [%] | Error [%] | Coverage [%] | Error [%] |
| [1.0; 0.9] | 4.87 | 0.02 | 14.30 | 0.10 | 9.36 | 0.03 | 12.98 | 0.19 |
| [1.0; 0.8] | 9.39 | 0.11 | 21.93 | 0.13 | 15.80 | 0.13 | 20.90 | 0.32 |
| [1.0; 0.7] | 14.80 | 0.26 | 28.73 | 0.19 | 23.77 | 0.38 | 29.39 | 0.39 |
| [1.0; 0.6] | 20.84 | 0.44 | 35.88 | 0.29 | 33.39 | 0.82 | 38.71 | 0.48 |
| [1.0; 0.5] | 29.10 | 0.57 | 43.99 | 0.47 | 44.01 | 1.61 | 48.22 | 0.72 |
| [1.0; 0.4] | 38.53 | 0.74 | 52.03 | 0.58 | 54.22 | 2.41 | 56.78 | 1.12 |
| [1.0; 0.3] | 47.68 | 1.09 | 58.56 | 0.78 | 61.56 | 3.23 | 63.57 | 1.65 |
| [1.0; 0.2] | 57.64 | 1.75 | 65.70 | 1.18 | 68.71 | 4.21 | 69.98 | 2.29 |
| [1.0; 0.1] | 67.64 | 2.83 | 72.86 | 1.73 | 74.67 | 5.31 | 75.22 | 3.16 |
| [1.0; 0.0] | 100.00 | 13.67 | 100.00 | 7.53 | 100.00 | 14.29 | 100.00 | 10.12 |

With an average coverage of 11.01% for the highest interval [1.0; 0.9] the coverage for the individual image pairs ranges from 4.87% for Tsukuba to 14.30% for Venus. For the interval [1.0; 0.1] with an average coverage of nearly 75% the coverage for the individual images deviates from 67.64% to 75.22%. One explanation for this is that the degree of difficulty to find accurate point correspondences varies among the four image pairs. But at the same time it outlines the power of the confidence evaluation to discriminate between good and bad matches.

The results for γ=4 are interesting, as an exceptionally low share of bad matches is achieved for the higher intervals. In addition, the concentration of bad matches in the lowest interval [0.1; 0.0] is quite high. On the other hand, over 30% of all non-occluded pixels are covered by the lowest interval comprising also a lot of good matches. Here a better discrimination between good and bad matches would be beneficial.

Figure 6:
FIG. 6 shows annotated disparity maps for the Teddy stereo image pair for a range factor $\gamma=3$.
Figure 6:
Figure 6:
Figure 6:
Figure 6:
Figure 6:
Figure 6:
Figure 6:
Figure 6:
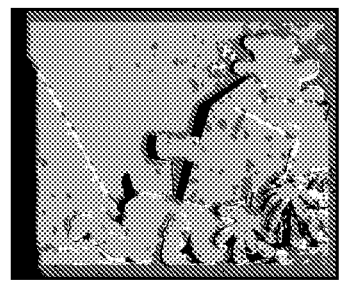
Figure 6:

To further illustrate the results for γ=3.0, annotated disparity images for one of the four stereo pairs (Teddy) are depicted in FIGS. 6a) to j). In the figures, black areas designate occluded pixels or pixels belonging to the border region, white areas designate bad matches, light grey areas designate good matches, and dark grey areas designate pixels outside the confidence interval.

The results of the evaluation clearly substantiate that the selectivity of the confidence evaluation can be increased with only a single parameter, the range factor γ that defines the minimum distances that a pixel with a reliable disparity estimate must have to pixels with unreliable or not reliable disparity estimates to be assigned a maximum confidence value. The increased selectivity leads to a lower share of bad matches, especially for the higher confidence intervals, but at the cost of a reduced coverage. The average share of bad pixels can be reduced to 0% for the highest confidence interval [1.0; 0.9] for γ=4. Moreover, the results show the improved concentration of bad matches at the confidence of 0. In the end, there is a trade-off between an increased selectivity (lower share of bad pixels for the higher intervals) and the achieved coverage. Thus, the selection of a range factor suited best clearly depends on the application.

The invention claimed is:

1. A method for determining a confidence value of a disparity estimate for a pixel or a group of pixels of a selected image of at least two stereo images, wherein the confidence value is a measure for an improved reliability value of the disparity estimate for the pixel or the group of pixels, the method comprising:
   determining an initial reliability value of the disparity estimate for the pixel or the group of pixels, wherein the initial reliability value is one of at least reliable and unreliable;

determining a first distance of the pixel or the group of pixels to a nearest pixel or group of pixels with an unreliable disparity estimate;

determining a second distance of the pixel or the group of pixels to a nearest pixel or group of pixels with a not-reliable disparity estimate, wherein the not-reliable disparity estimate is either undecided or unreliable;

determining the confidence value of the disparity estimate for the pixel or the group of pixels from the determined first distance and the determined second distance;

determining a special consistency value from the determined first distance, an upper bound for the first distance, the determined second distance, and a range factor; and classifying the disparity estimate of the pixel or the group of pixels as undecided if the disparity estimate of the pixel or the group of pixels is neither reliable nor unreliable.

2. The method according to claim 1, wherein the initial reliability value of the pixel or the group of pixels is determined from a remaining distance between the pixel or the group of pixels in a first stereo image and a back reference of a corresponding pixel or a corresponding group of pixels in a second stereo image, wherein the corresponding pixel or the corresponding group of pixels is defined by the disparity estimate for the pixel or the group of pixels of the selected image.

3. The method according to claim 2, wherein the disparity estimate of the pixel or the group of pixels is classified as unreliable if the remaining distance is equal to or larger than an upper threshold, and wherein the disparity estimate of the pixel or the group of pixels is classified as reliable if the remaining distance is equal to or lower than a lower threshold.

4. The method according to claim 2, wherein the upper threshold is three pixels and the lower threshold is zero.

5. The method according to claim 1, further comprising the step of determining a visibility of the pixel or the group of pixels, wherein a pixel or a group of pixels in the first stereo image is visible if it is matched by at least one pixel or at least one group of pixels in the second stereo image, and wherein a pixel or a group of pixels in the first stereo image is not visible if it is not matched by any pixel or any group of pixels in the second stereo image.

6. The method according to claim 5, wherein the disparity estimate of the pixel or the group of pixels is also classified as reliable if the remaining distance is equal to the lower threshold plus one and the pixel or the group of pixels is not visible.

7. The method according to claim 1, wherein the confidence value of the disparity estimate for the pixel or the group of pixels is determined by multiplying the special consistency value with a scaled matching quality value.

8. The method according to claim 1, wherein a confidence value of zero is assigned to the disparity estimate of the pixel or the group of pixels if the disparity estimate of the pixel or the group of pixels is classified as unreliable.

9. The method according to claim 1, wherein the range factor defines a minimum distance that a pixel or a group of pixels with a reliable disparity estimate must have to pixels or groups of pixels with unreliable or not reliable disparity estimates to be assigned a maximum confidence value.

* * * * *